United States Patent [19]

Ikeda

[11] Patent Number: 4,860,061
[45] Date of Patent: Aug. 22, 1989

[54] MULTIFACE IMAGE COMPOSER

[76] Inventor: Shigeru Ikeda, 22, Nishi 8-chome, Kita 25-jo, Kita-ku, Sapporo-city, Japan

[21] Appl. No.: 153,254

[22] Filed: Feb. 8, 1988

[30] Foreign Application Priority Data

Feb. 6, 1987 [JP] Japan ................................. 62-026796

[51] Int. Cl.4 ........................ G03B 27/52; G03B 27/70
[52] U.S. Cl. ........................................ 355/43; 355/35; 355/37
[58] Field of Search ............................. 355/35, 37, 43

[56] References Cited

U.S. PATENT DOCUMENTS

| | | | |
|---|---|---|---|
| 1,959,498 | 5/1934 | Planskoy | 355/43 |
| 2,622,475 | 12/1952 | Tondreau | 355/43 |
| 3,155,978 | 11/1964 | Seitz | 355/43 |
| 4,018,527 | 4/1977 | Bartel et al. | 355/35 |
| 4,143,966 | 3/1979 | Gandini | 355/35 |

Primary Examiner—Monroe H. Hayes
Attorney, Agent, or Firm—Goodman & Teitelbaum

[57] ABSTRACT

The multiface image composer is suitable for use with a photographic enlarger, a projector, a slide projector and the like and it comprises a central image generator, a left side image generator and a right side image generator each arranged on a line crossing each other at right angle, half mirror means being arranged on the crossing point of the lines, the half mirror means being capable of being oriented at the angle of 45 deg. with respect to the line on which the image generator is arranged for directing the relected light of the image therefrom to a base plate on which a composite image is to be formed.

4 Claims, 8 Drawing Sheets

MULTIFACE IMAGE COMPOSER

BACKGROUND OF THE INVENTION

1. Field of the Invention

The present invention relates to an image composer, and, more particularly, to a multiface image composer suitable for use with a photographic enlarger, a projector, a slide projector and the like.

2. Statement of the Prior Art

Heretofore, when a composite photographic picture is to be produced, a photosensitive film or a photographic paper is subjected to multiple exposures so as to produce a composite picture. Such an operation, however, requires a high technical skill of the draftsman and is fairly timeconsuming.

SUMMARY OF THE INVENTION

The object of the present invention is to provide a novel multiface image composer which avoids the disadvantages of the prior art image composer described above.

The above object is achieved in accordance with the present invention by the provision of a multiface image composer wherein each image generator is arranged on a line intersecting each other at right angle, and a half transmitting reflecting mirror each required for the predetermined image generators is set at the intersecting point of the lines of each of the image generators each of which lines forms the center line or the optical axis thereof, thereby permitting the two or three images produced by the respective generators to be superposed to form a single composite image.

The image composer of the present invention is intended particularly for use with a photographic enlarger, a projector, a slide projector and the like.

DETAILED DESCRIPTION OF THE PREFERRED EMBODIMENTS

Figure 1:
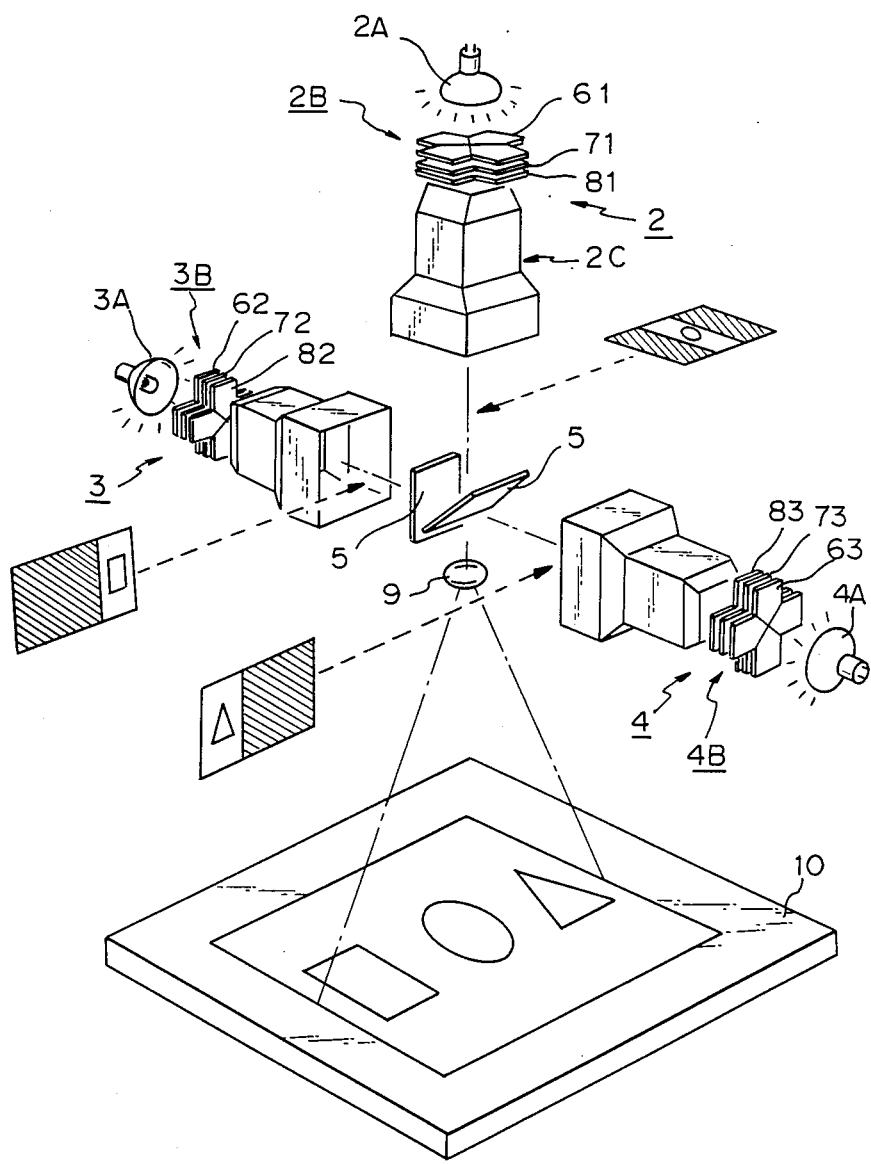
FIG. 1 is a schematic perspective view showing the general construction of the image composer of the present invention.
Figure 2:
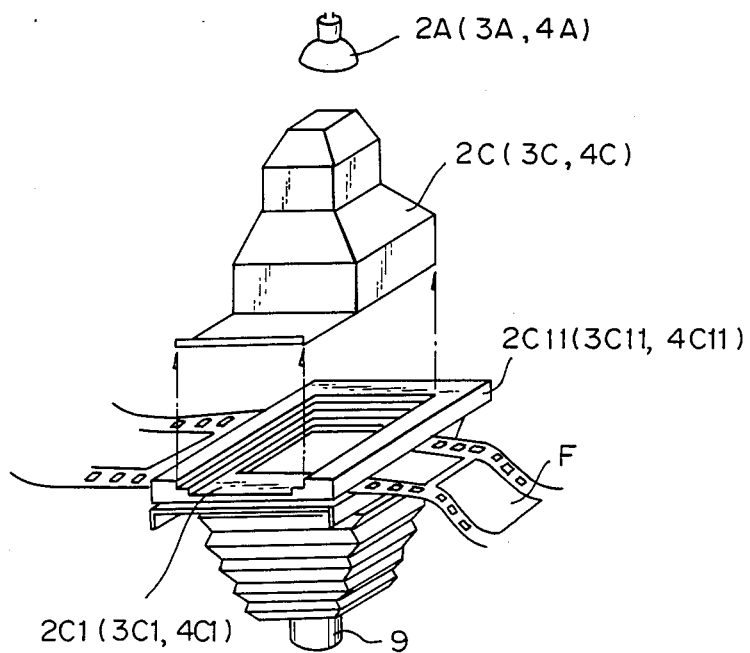
FIG. 2 is a perspective view showing the diffusion box of the central image generator.

FIG. 1 shows the multiface image composer of the present invention.

It comprises a central image generator 2, a left side image generator 3 and a right side image generator 4 each arranged on a line crossing each other at right angle, and half mirrors 5, 5 are arranged at the intersecting point of the center lines or the optical axis of the respective image generators 2, 3 and 4 and selectively positionable at an angle of 45 deg. with respect to the respective center lines of the left side and right side image generators 3, 4.

Reference numeral 9 designates a lens and reference numeral 10 designates a base plate each arranged on the center line of the central image generator 2 at positions beyond the intersecting point.

The central image generator 2 is constructed by a lamp 2A, a group 2B of dichroic filters (colored filters) and a diffusion box 2C around on the center line thereof in order from the top toward downwardly within a freely moveable vertical color box.

Figure 3:
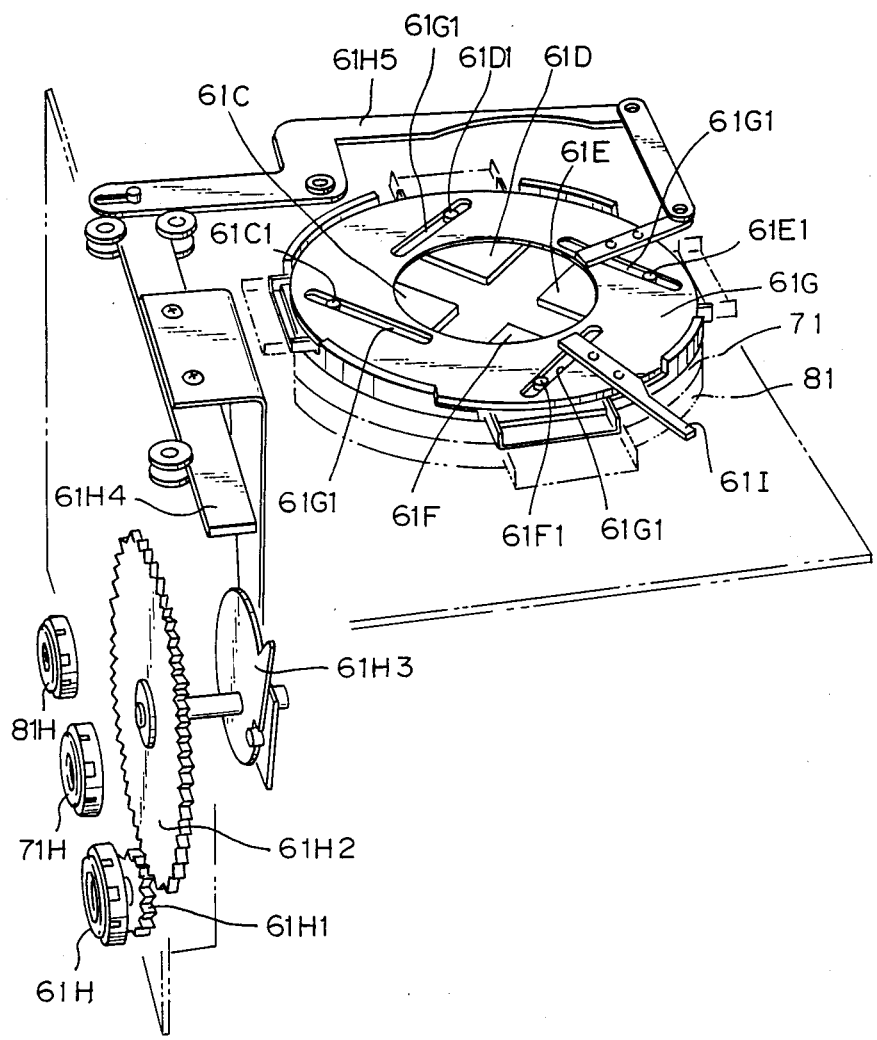
FIG. 3 is a perspective view showing a group of central dichroic filters.
Figure 4:
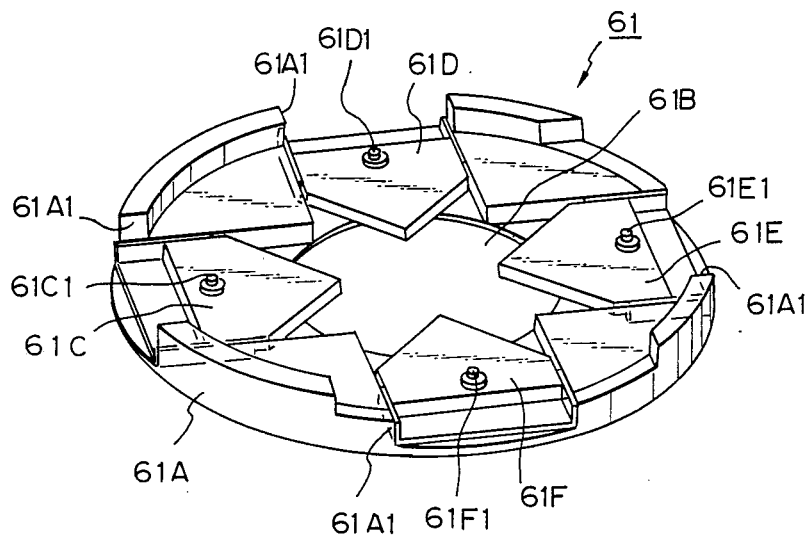
FIG. 4 is an enlarged perspective view showing the main part of the group of central dichroic filters with the cyan filter being mainly shown.

The central group 2B of dichroic filters comprises a cyan section 61, a magenta section 71 and a yellow section 81 arranged in vertically superposed relationship to each other. Since the construction of these sections 61, 71 and 81 is similar to each other, the cyan section 61 is described mainly with reference to FIGS. 3 and 4.

Reference numeral 61A designates a base frame in the form of a planar doughnut having a circular central opening 61B, on which base frame first, second, third and fourth cyan filters 61C, 61D, 61E and 61F are slidably mounted and adapted to be moved radially, toward and away from the center of the opening 61B to close and open the circular opening 61B from the four sides around the same. In this case, each of the filters 61C, 61D, 61E and 61F comprises a glass plate with the tip thereof being pointed by the angle of 90 deg. and these filters are adapted to be moved simultaneously toward and away from the center of the base frame 61A. Reference numerals 61C1, 61D1, 61E1 and 61F1 designate small projections protruding from the upper surfaces of the respective filters.

The base frame 61A is supported by a suitable frame (not shown) and is formed with four grooves 61A1 in which the respective filters 61C, 61D, 61E and 61F are slidably moved toward and away from the center of the opening 61B of the base frame 61A.

Reference numeral 61G designates a rotatable disc in the form of a doughnut located on the upper surfaces of the filters and it is formed with four elongated grooves 61G1 extending obliquely with respect to the radii of the opening 61B in which the small projections 61C1, 61D1, 61E1 and 61F1 slidably engage for permitting the respective filters 61C, 61D, 61E and 61F to be moved toward and away from the center of the opening 61B by the rotation of the disc 61G. A knob 61H for moving the filters and adjusting the density thereof is coupled with a cam 61H3 through a pinion 61H1, a large gear 61H2, and the cam 61H3 cooperates with a horizontally moveable plate 61H4 so as to move the latter horizontally by the rotation of the former. The horizontal plate 61H4 is coupled with the rotatable disc 61G through a power multiplying lever 61H5 pivotally connected to the plate 61H4. Thus the rotatable disc 61G is rotated by rotating the knob 61H by an amount correspondingly to the amount of rotation of the knob 61H to thereby move the respective filters simultaneously toward and away from the center of the opening 61B Reference numeral 61I designates a lever secured to the rotatable disc 61G, and the lever 61I may also be used for rotating the disc 61G.

Figure 5:
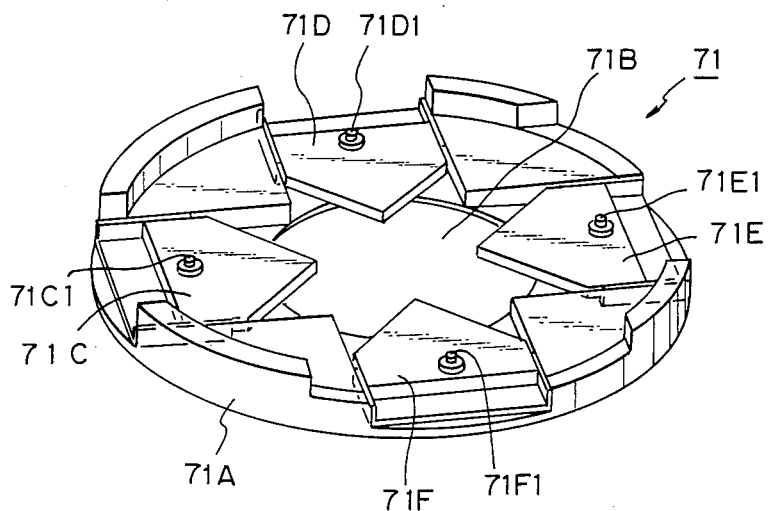
FIG. 5 is an enlarged perspective view showing the main part of the group of central dichroic filters with the magenta filter being mainly shown.

The magenta section 71 will be described below with reference to FIG. 5.

The base frame 71A in the form of a planar doughnut has a circular opening 71B formed at the center thereof and mounts thereon first, second, third and fourth magenta filters 71C, 71D, 71E and 71F which are moved so as to open and close the opening 71B from the four sides about the opening 71B. Each of the filters 71C, 71D, 71E and 71F comprises a glass plate with the tip thereof being pointed by an angle of 90 deg., and they are adapted to be moved simultaneously toward and away from the center of the opening 71B of the base frame 71A in the similar manner as in the case of the cyan section 61.

Small projections 71C1, 71D1, 71E1 and 71F1 each protruding from the upper surface of the respective filter are coupled with a rotatable disc (not shown) which is in turn operatively connected to a knob 71H (not shown) for moving the filters and for adjusting the density thereof in the similar manner as in the case of the cyan section 61.

Figure 6:
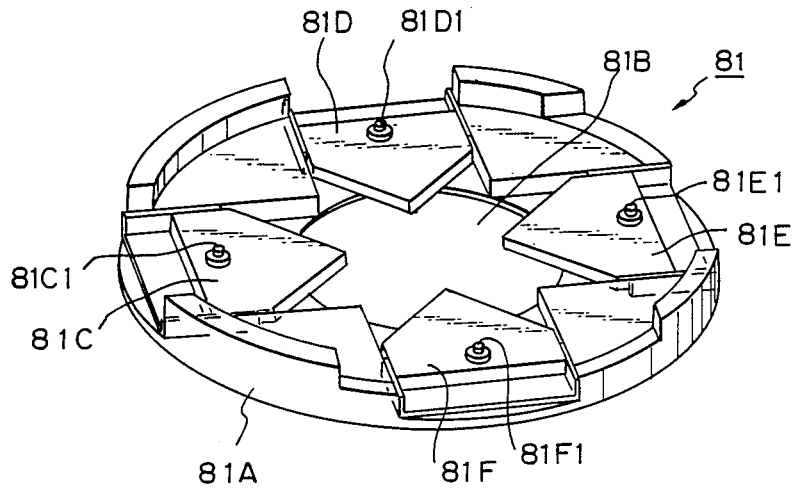
FIG. 6 is an enlarged perspective view showing the main part of the group of central dichroic filters with the yellow filter being mainly shown.

The construction of the yellow section 81 is shown in FIG. 6. In like manner as in the case of the magenta section 71, a base frame 81A in the form of a planar doughnut mounts thereon first, second, third and fourth yellow filters 81C, 81D, 81E and 81F for opening and closing the circular opening 81B of the base frame 81A from the four sides around the same. Each of the filters 81C, 81D, 81E and 81F comprises a glass plate with its tip being pointed by an angle of 90 deg. These filters are moved simultaneously toward and away from the center of the opening 81B of the base frame 81A. To this end, small projections 81C1, 81D1, 81E1 and 81F1 protrude from the upper surfaces of the respective filters, and the small projections are coupled with a rotatable disc (not shown) which is in turn operatively connected to a knob 81H (not shown) for moving the filters and for adjusting the density thereof in like manner as in the case of the magenta section 71.

The left side image generator 3 comprises a lamp 3A, a group 3B of dichroic filters (colored glass plates) and a diffusion box 3C arranged on the central axis thereof in order from the outer side toward the center of the image composer and located in a moveable horizontal color box.

The left side group 3B of dichroic filters comprises a cyan section 62, a magenta section 72 and a yellow section 82 arranged in superposed relationship to each other from left side thereof toward the center of the image composer.

Figure 7:
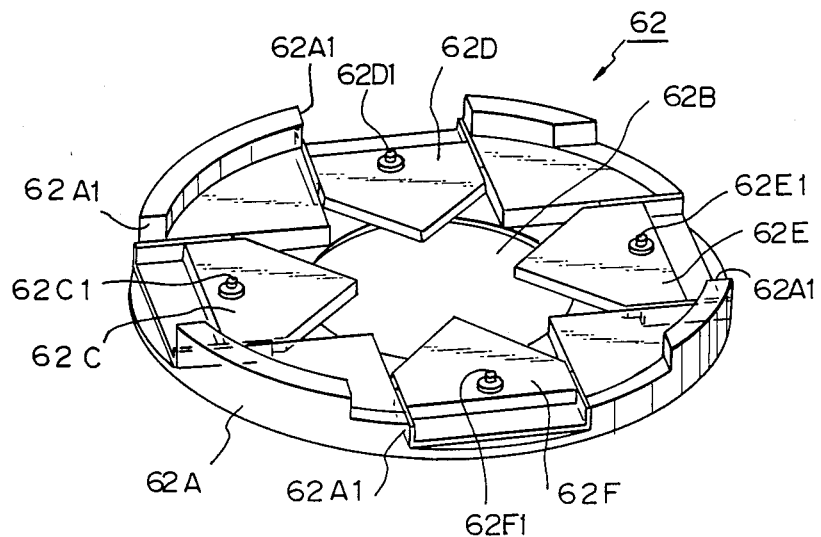
FIG. 7 is an enlarged perspective view showing the main part of the left side group of dichroic filters with the cyan filter being mainly shown.

Referring to FIG. 7, a base frame 62A having a circular opening 62B at the center thereof mounts thereon first, second, third and fourth cyan filters 62C, 62D, 62E and 62F which open and close the opening 62B from the four side therearound. Each of the filters 62C, 62D, 62E and 62F comprises a glass plate with its tip being pointed by the angle of 90 deg., and they are adapted to move simultaneously toward and away from the center of the opening 62B of the frame 62A. Small projections 62C1, 62D1, 62E1 and 62F1 protrude from the upper surfaces of the respective filters and engage with a rotatable disc (not shown) for moving the filters in the similar manner as in the case of the central image generator 2.

The base frame 62A is supported by a suitable frame and is formed with grooves 62A1 in which the filters 62C, 62D, 62E and 62F slidably move therealong, respectively, in like manner as in the case of the central image generator 2.

The construction of the magenta section 72 will be described below with reference to FIG. 8, a base frame 72A in the form of a planar doughnut has a circular opening 72B at its center and mounts thereon first, second, third and fourth magenta filters 72C, 72D, 72E and 72F for opening and closing the opening 72B. Each of the filters 72C, 72D, 72E and 72F comprises a glass plate with its tip being pointed by an angle of 90 deg., and they are adapted to move toward and away from the center of the opening 72B of the base plate 72A in like manner as in the case of the cyan section 62.

Small projections 71C1, 71D1, 71E1 and 71F1 protrude from the upper surfaces of the respective filters and they are operatively coupled with a rotatable disc (not shown) which is in turn operatively connected to a knob 72H (not shown) for moving the filters and for adjusting the density thereof in like manner as in the case of the cyan section 62.

The construction of the yellow section 82 will be described below with reference to FIG. 9.

A base frame 82A in the form of planar doughnut having a circular opening 82B at the center thereof mounts thereon first, second, third and fourth yellow filters 82C, 82D, 82E and 82F each of which comprises a glass plate having its tip pointed by an angle of 90 deg. The filters are adapted to move simultaneously toward and away from the center of the opening 82B. Small projections protrude from the upper surfaces of the respective filters and engage with a rotatable disc (not shown) which is in turn coupled with an adjusting knob for moving the same by the rotation of a knob for moving the filters and for adjusting the density thereof in like manner as in the case of the magenta section 72.

The right side image generator 4 comprises a lamp 4A, a right side group 4B of dichroic filters (colored glass plates) and a diffusion box 4C arranged on the center line thereof in order from the outer side toward the center of the image composer within a moveable color box.

The right side group 4B of dichroic filters comprises a cyan section 63, a magenta section 73 and a yellow section 83 arranged in superposed relationship to each other from the outer side toward the center of the image composer.

Figure 10:
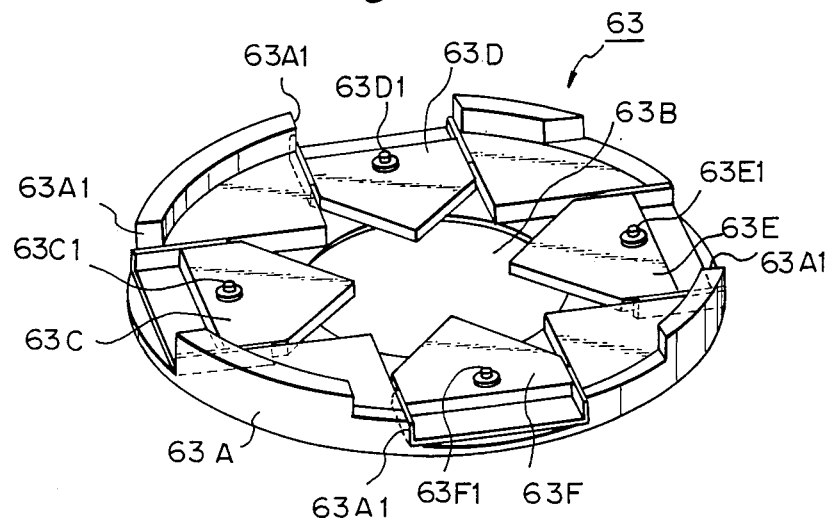
FIG. 10 is an enlarged perspective view showing the main part of the right side group of dichroic filters with the cyan filter being mainly shown.

Referring to FIG. 10, a base frame. 63A in the form of a planar doughnut having a circular opening 63B at its center mounts thereon first, second, third and fourth cyan filters 63C, 63D, 63E and 63F for opening and closing the opening 63B from the four sides therearound in like manner as in the case of the group 3B of dichroic filters of the left side image generator 3. Each of the filters 63C, 63D, 63E and 63F comprises a glass plate with its tip being pointed by an angle of 90 deg., and they are adapted to move simultaneously toward and away from the center of the opening 63B of the base frame 63A. Small projections 63C1, 63D1, 63E1 and 63F1 protrude from the upper surfaces of the respective filters for moving the filters in cooperation with a rotatable disc (not shown) similar in construction to the disc 61G of the central image generator 2. The base frame 63A is supported by a suitable frame and is formed with four grooves 63A1 in which the respective filters 63C, 63D, 63E and 63F slidably move radially outwardly and inwardly.

The construction of the magenta section 73 will be described below with reference to FIG. 11.

In like manner as in the case of the cyan section 3, it comprises a base frame 73A having a central circular opening 73B which base frame mounts thereon first, second, third and fourth magenta filters 73C, 73D, 73E and 73F each comprised of a glass plate with its tip being pointed by an angle of 90 deg. The filters are adapted to move simultaneously toward and away from the center of the opening 73B.

To this end, projections 73C1, 73D1, 73E1 and 73F1 protrude from the upper surfaces of the respective filters which cooperate with a rotatable disc (not shown) coupled with a knob for moving the filters and for adjusting the density thereof so as to move the filters radially inwardly and outwardly by the rotation of the knob in like manner as in the case of the cyan section 63.

The construction of the yellow section 83 will be described below with reference to FIG. 12.

In like manner as in the case of the magenta section 73, it comprises a base frame 83A in the form of a planar doughnut having a circular central opening 83B. First, second, third and fourth yellow filters 83C, 83D, 83E and 83F each comprised of a glass plate with its tip pointed by an angle of 90 deg. are slidably mounted in the grooves formed in the frame 83A so as to be moved toward and away from the center of the opening 83B along lines passing through the center of the opening 83B and crossing each other at right angle, respectively. Small projections 83C1, 83D1, 83E1 and 83F1 protrude from the upper surfaces of the respective filters for moving the filters radially inwardly and outwardly in cooperation with a rotatable disc (not shown) which is coupled with a knob for moving the filters and for adjusting the density thereof in like manner as in the case of the magenta section 73.

Figure 8:
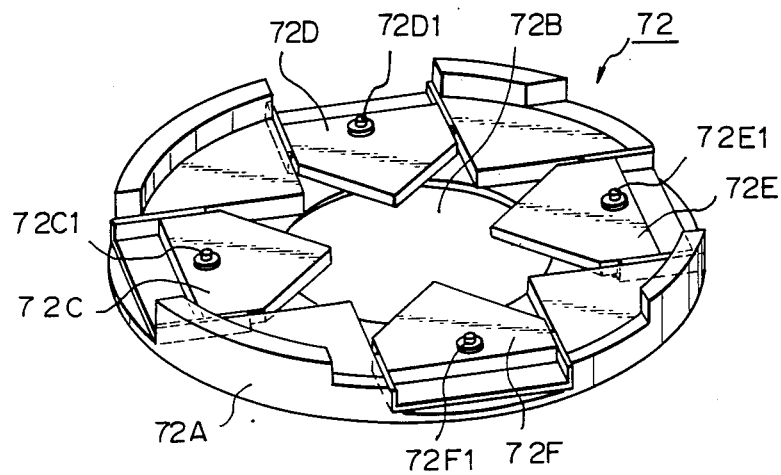
FIG. 8 is an enlarged perspective view showing the main part of the left side group of dichroic filters with the magenta filter being mainly shown.
Figure 9:
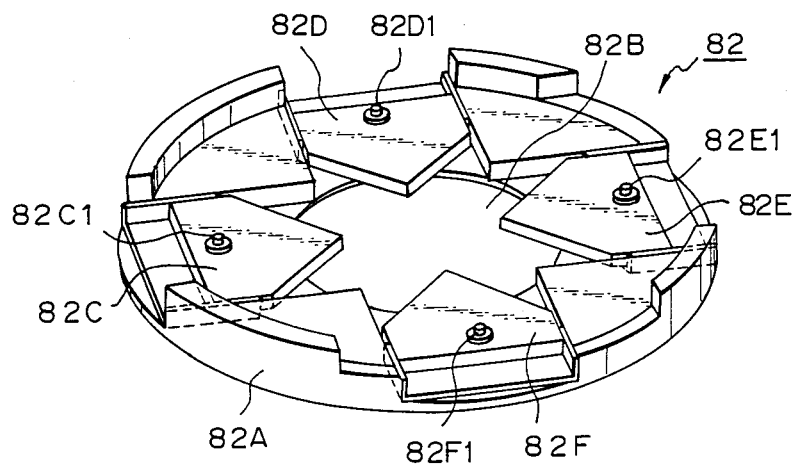
FIG. 9 is an enlarged perspective view showing the main part of the left side group of dichroic filters with the yellow filter being mainly shown.
Figure 11:
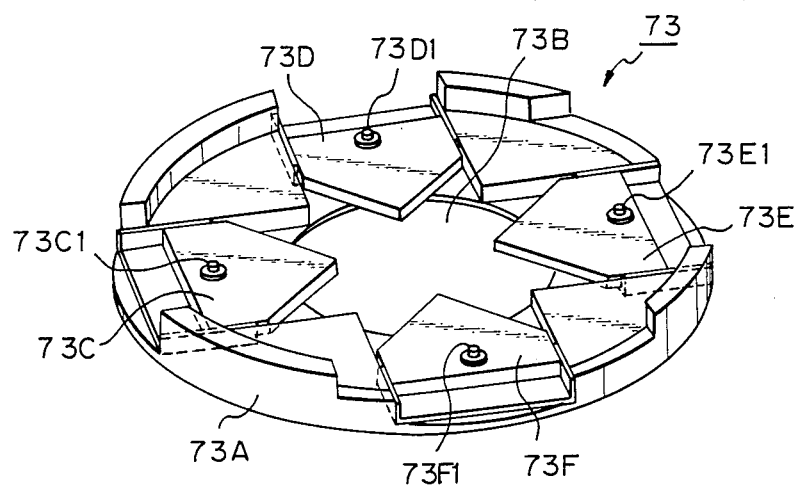
FIG. 11 is an enlarged perspective view showing the main part of the right side groups of dichroic filters with the magenta filter being mainly shown.
Figure 12:
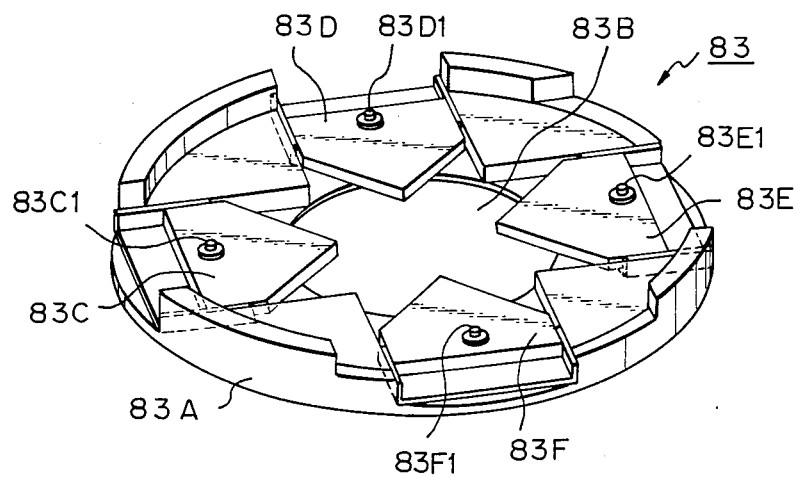
FIG. 12 is an enlarged perspective view showing the main part of the right side group of dichroic filters with the yellow filter being mainly shown.

For convenience of preparing the drawings, FIG. 7, 8 and 9 show the components shown therein with the right hand side thereof being directed toward upward, respectively, while FIGS. 10, 11 and 12 show the components shown therein with the left hand side being directed toward upward.

The function of each of the dichroic filter groups 2B, 3B and 4B is as follows.

Since the adjustment of the density by the filters is effected from the four sides arranged around the central opening of the base frame in equal angular spacing from each other, the adjustment is considered to be effected substantially in the entire surface of the central opening, and, therefore, nonuniformity in color will not occur and a uniform reflection in the diffusion box having the cross section of a square shape or a circular shape is achieved. Thus, it is made possible to reduce the number of the conventional milk opal plates to less than the number a half of the number normally required in the prior art or to lower the density to less than a half of the density normally required in the prior art thereby permitting a greater light quantity to be achieved.

By virtue of the fact that a higher light quantity is obtained by the present invention, it is made possible to greatly reduce the time required for producing enlarged pictures thereby permitting enlarged color pictures of a sharp resolution to be obtained.

The half mirrors 5, 5 are made of glass plates to each of which a coating is applied for making the half mirrors. When the central image generator 2 and the right side image generator 4 are to be used as shown in FIG. 1, the half mirror 5 belonging to the right side image generator is so positioned that it passes therethrough the light ray issued from the central image generator 2, while the light ray issued from the right side image generator 4 is reflected by the half mirror 5 so as to be deflected by the angle of 90 deg. and directed toward downwardly onto the base plate 10.

FIG. 1 shows two half mirrors 5, 5, one of which is inclined at an angle of 45 deg. with respect to the center line or the optical axis of the right side image generator 4, while the other belonging to the left side image generator 3 is arranged perpendicular to the optical axis of the left side image generator 3. When the central image generator 2 and the left side image generator 3 are used for producing a composite image, the mirror 5 shown in FIG. 1 as being arranged perpendicular with respect to the center line of the left side image generator 3 is inclined at the required angle with respect to the optical axis, i.e. 45 deg., while the other mirror 5 shown in FIG. 1 as being inclined is position perpendicular to the center line of the right side image generator 4.

As to each of the diffusion boxes 2C, 3C and 4C, spaces 2C1, 3C1 and 4C1 each having a thin thickness is formed between the respective diffusion box and the respective film F so that filters for adjusting the light quantity, the color or the filters for coloring can be optionally inserted into the respective spaces.

Concretely saying, frames 2C11, 3C11 and 4C11 each formed therein a recess of a small depth for forming the space 2C1, 3C1, 4C1 are arranged on the lower surfaces of the respective diffusion boxes for locating the filters within the space 2C1, 3C1, 4C1.

The color filters can be interchangeably inserted in these thin spaces 2C1, 3C1, 4C1, respectively, or they can be located therein at the desired positions while the tone of color is being observed. Further, when the filters are inserted into the required positions above the film F after the focusing of the composite image has been completed, the accuracy in the operation is improved and the time required for the operation is greatly reduced thereby affording great convenience to the operator.

By virtue of the fact that the operation can be carried out while various conditions in the dark room are ascertained, the chances of failures requiring reprinting color pictures after termination of color printing are greatly reduced.

As to the procedures of carrying out the present invention, after the central image generator 2 and the right side image generator 4 are energized and the half mirrors 5 are oriented at the position shown in FIG. 1 and the various optical adjustments are effected, the images from the image generators 2 and 4 are superposed on the base plate 10. Thereafter, the half mirror 5 which has been positioned perpendicular to the center line of the left side image generator 3 is inclined to the angle of 45 deg. with respect to the center line of the left side image generator 3 and the other half mirror 5 is oriented perpendicular to the center line of the right side image generator 4, and the left side image generator 3 is energized after the optical adjustment thereof is completed so that, the image from the left side image generator 3 is superpose onto the previously superposed composite image on the base plate 10.

The above described procedures result in the mechanical superposition of the images from the image generators 2, 3 and 4. However, it is made possible that a separate image is formed within a selected range in the already formed image on the base plate 10 by the masking operation, or it is possible to insert desired words or characters and the like within a selected range in the already formed image on the base plate 10 by the masking operation.

With the image composer of the present invention, no skilled craftsman is required for obtaining the desired composite images of a high quality.

What is claimed is:

1. A multiface image composer comprising:
    a first image generator producing a first light ray having a first optical axis;
    a second image generator producing a second light ray having a second optical axis;
    a third image generator producing a third light ray having a third optical axis;
    said second and third image generators facing each other so that said second and third optical axes coincide;
    said first image generator being disposed between said second and third image generators so that said first optical axis intersects said second and third optical axes at a right angle to provide a common intersection point for said first, second and third optical axes;
    said first image generator facing towards a base plate with said common intersection point being disposed between said first image generator and said base plate;
    half mirror means being disposed at said common intersection point and being movable between first and second positions;
    said half mirror means permitting said first light ray to pass directly therethrough along said first optical axis towards said base plate when in both said first and second positions;
    said half mirror means, when in said first position, reflecting said second light ray so that said second light ray is deflected 90 degrees towards said base plate to coincide with said first light ray along said first optical axis to produce a first composite image, while simultaneously preventing deflection of said third light ray towards said base plate;
    said half mirror means, when in said second position, reflecting said third light ray so that said third light ray is deflected 90 degrees towards said base plate to coincide with said first light ray along said first optical axis to produce a second composite image, while simultaneously preventing deflection of said second light ray towards said base plate; and
    a lens being positioned on said first optical axis between said half mirror means and said base plate for focusing said first and second composite images, one at a time, onto said base plate so that a final composite image can be formed on said base plate by superposing said second composite image onto said first composite image after said first composite image has been formed on said base plate.

2. A multiface image composer according to claim 1, wherein said half mirror means includes first and second half mirrors disposed along said coinciding second and third optical axes;
    said first half mirror in said first position being at said common intersection point and being inclined 45 degrees with respect to said second optical axis, while said second half mirror in said first position is arranged perpendicular to said third optical axis; and
    said second half mirror in said second position being at said common intersection point and being inclined 45 degrees with respect to said third optical axis, while said first half mirror in said second position is arranged perpendicular to said second optical axis.

3. A multiface image composer according to claim 1, wherein a lamp, a group of dichroic filters and a diffusion box are arranged in a freely moveable color box of each of said image generators in a respective order from an outer side thereof toward said common intersection point, a thin space being provided in each said diffusion box into which further filters are detachably inserted.

4. A multiface image composer according to claim 3, wherein said group of dichroic filters of each image generator comprises a cyan section, a magenta section and a yellow section arranged in superposed relationship to each other.

* * * * *